United States Patent
Hudson et al.

(10) Patent No.: US 9,774,407 B2
(45) Date of Patent: Sep. 26, 2017

(54) APPARATUS AND METHOD FOR NON-DETERMINATIVE TESTING USING UNSCRIPTED COMMUNICATIONS BETWEEN A NETWORK SIMULATOR AND AN EQUIPMENT UNDER TEST

(71) Applicant: Keysight Technologies Singapore (Holdings) PTE. LTD., Minneapolis, MN (US)

(72) Inventors: Colin Hudson, Surrey (GB); Michael O'Gara, Hampshire (GB)

(73) Assignee: Keysight Technologies Singapore (Holdings) Pte. Ltd., Singapore (SG)

( * ) Notice: Subject to any disclaimer, the term of this patent is extended or adjusted under 35 U.S.C. 154(b) by 0 days.

(21) Appl. No.: 14/649,536

(22) PCT Filed: Nov. 14, 2013

(86) PCT No.: PCT/GB2013/053006
§ 371 (c)(1),
(2) Date: Jun. 3, 2015

(87) PCT Pub. No.: WO2014/087130
PCT Pub. Date: Jun. 12, 2014

(65) Prior Publication Data
US 2015/0318935 A1    Nov. 5, 2015

(30) Foreign Application Priority Data
Dec. 4, 2012    (GB) .................................. 1221810.3

(51) Int. Cl.
*H04B 17/00*    (2015.01)
*H04L 1/24*    (2006.01)
(Continued)

(52) U.S. Cl.
CPC ......... *H04B 17/0085* (2013.01); *H04L 1/244* (2013.01); *H04L 41/145* (2013.01);
(Continued)

(58) Field of Classification Search
None
See application file for complete search history.

(56) References Cited

U.S. PATENT DOCUMENTS

| 6,011,830 | A | * | 1/2000 | Sasin | H04M 3/323 |
| | | | | | 379/10.03 |
| 2006/0085687 | A1 | * | 4/2006 | Cheng | G06F 11/36 |
| | | | | | 714/38.1 |

(Continued)

FOREIGN PATENT DOCUMENTS

| EP | 0589576 A2 | 3/1994 |
| EP | 1463353 A2 | 9/2004 |

OTHER PUBLICATIONS

Letter dated Apr. 15, 2013 in UK Application No. GB1221810.3.
(Continued)

*Primary Examiner* — Alejandro Rivero

(57) ABSTRACT

A test apparatus is configured to perform non-determinative testing of equipment. The test apparatus comprises a test computer arranged to automatically execute a non determinative test regime under the control of a test application. A network simulator connected to the test computer is provided with communication circuitry operable to communicate with the equipment under test. The network simulator is configurable into different network states according to the non-determinative test regime, and the test application is operable to control the network simulator to transition between a plurality of different network states. Data about unscripted communications between the network simulator (Continued)

and the equipment under test is monitored and can be analyzed to reach a test verdict.

16 Claims, 5 Drawing Sheets

(51) Int. Cl.
    *H04W 24/06*     (2009.01)
    *H04L 12/24*     (2006.01)
    *H04L 12/26*     (2006.01)
    *H04W 24/08*     (2009.01)

(52) U.S. Cl.
    CPC ............ *H04L 43/50* (2013.01); *H04W 24/06* (2013.01); *H04W 24/08* (2013.01)

(56) References Cited

U.S. PATENT DOCUMENTS

| | | |
|---|---|---|
| 2012/0071154 A1 | 3/2012 | Thompson |
| 2014/0078925 A1 | 3/2014 | Thompson |
| 2014/0315507 A1 | 10/2014 | Thompson |
| 2015/0237199 A1 | 8/2015 | Hameenniemi et al. |

OTHER PUBLICATIONS

Search Report dated Apr. 12, 2013 in UK Application No. GB1221810.3.

Nemo Analyze 5.14 Release, Anite.com, May 28, 2009 [retrieved on Mar. 16, 2016]. Retrieved from the Internet: <URL: http://www.anite.com/businesses/networks-testing/news/nemo-analyze-514-lte-support-and-nemo-analyze-514-enterprise>.

SAS: Network simulator solution for interoperability testing, Anite.com, Feb. 2011 [retrieved on Apr. 8, 2016]. Retrieved from the Internet: <URL:http://www.anite.com/sites/default/files/attachments/InteroperabilityTestingSASfactsheet.pdf>.

International Search Report dated Feb. 7, 2014 for PCT Application No. PCT/GB2013/053006.

International Preliminary Report on Patentability dated Jun. 9, 2015 for PCT Application No. PCT/GB2013/053006.

Written Opinion dated Feb. 7, 2014 for PCT Application No. PCT/GB2013/053006.

\* cited by examiner

| Net SIM settings |
| --- |
| UE settings |
| UE device type |
| UE manufacturer |
| Timestamp |
| Message type |
| Location code |
| Payload data |
| Message size |

FIG. 5

APPARATUS AND METHOD FOR NON-DETERMINATIVE TESTING USING UNSCRIPTED COMMUNICATIONS BETWEEN A NETWORK SIMULATOR AND AN EQUIPMENT UNDER TEST

CROSS-REFERENCE TO RELATED APPLICATIONS

This application is the National Stage filing under 35 U.S.C. 371 of International Application No. PCT/GB2013/053006, filed on Nov. 14, 2013, which claims the benefit of earlier filing date and right of priority to United Kingdom (Great Britain) Application Serial No. 1221810.3, filed on Dec. 4, 2012, the contents of all of which are expressly incorporated by reference herein in their entireties.

FIELD OF THE INVENTION

This invention relates to apparatus and methods for testing, and particularly computer implemented apparatus and methods for testing or wireless testing of user equipment for example in respect of performance, interoperability and conformance with wireless standards.

DESCRIPTION OF THE RELATED ART

Apparatus and methods for testing of user equipment exist, however, the apparatus and testing methodologies available suffer a number of problems.

In a first known type of wireless testing, referred to herein as "script-based" testing, test computers control network simulators to automatically execute highly defined test scripts according to which a network simulator will send a series of messages to user equipment and the user equipment will respond. This is a type of deterministic testing in which the pass result is an inevitable consequence of an antecedent cause. The antecedent cause may be a single message or a series of messages but the inevitable consequence will either be met or not by the response from the equipment under test. Meeting the inevitable consequence in this type of script-based testing represents a "pass", whereas the absence of the inevitable consequence where expected represents a "fail". Script-based testing is good for automated large-scale testing of wireless user equipment but it is not very flexible and often misses types of faults that are not specifically identified by failing a highly defined test script.

An alternative is user-based testing in which operators cognitively determine test messages to be sent to user equipment and monitor the responses to determine what to test next. This is a manual process in which the user determines each test message and assesses the response. It is prone to human error and has limited scalability.

Neither of the above known testing techniques are at all effective at repeatable large-scale testing of user equipment behaviors over a range of differing network conditions.

Embodiments of the present invention seek to provide improved apparatus and methods for the testing of equipment, in particular wireless devices.

SUMMARY OF THE INVENTION

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect of the present invention there is provided a test apparatus configurable to perform testing of equipment, the apparatus comprising: a test computer arranged to execute a test under the control of a test application; and a network simulator provided with communication circuitry operable to communicate with the equipment under test, wherein the test application is operable to control network simulator transitions between a plurality of different network states, and wherein data about unscripted communications between the equipment and the network simulator in at least one said network state is monitored. The data may then be analysed to determine a test verdict.

According to another aspect of the present invention there is provided a test apparatus configurable to perform non-determinative testing of equipment, the apparatus comprising: a test computer arranged to automatically execute a non-determinative test regime under the control of a test application; and a network simulator connected to the test computer and provided with communication circuitry operable to communicate with the equipment under test, wherein the network simulator is configurable into different network states according to the non-determinative test regime, and wherein the test application is operable to control the network simulator to transition between a plurality of different network states and to monitor data about unscripted communications between the network simulator and the equipment in periods of interaction between said transitions.

According to another aspect of the present invention there is provided a test application for network simulator-based testing of equipment comprising computer program code adapted to run on a computer, the computer code being operable, when run on a computer, to cause the computer to: establish a first network simulator state using network parameters to be used according to a non-determinative test regime; monitor a period of unscripted communication between the network simulator and the equipment while the network simulator is in said first state; cause the network simulator to transition to a second network simulator 5 state based upon a second set of network parameters according to the test regime, monitor a period of unscripted communication between the network simulator and the equipment while the network simulator is in said second state; and cause log data relating to each network simulator state and associated communications between the network simulator and user equipment to be recorded in a log file.

According to another aspect of the present invention there is provided a network simulator configured for testing of equipment, the network simulator comprising: a protocol stack module; transmission circuitry including at least one antenna for communications with user equipment; and a controller having an interface to a test application, wherein the controller is operable to receive parameters from the test application, including protocol stack parameters, and to cause the network simulator to successively transition between a plurality of programmed network simulator states based on said parameters, and wherein in the controller is operable to monitor periods of unscripted communication between the equipment under test and the network simulator during each network state.

Further and optional features of test apparatus, test applications and network simulators are provided in the appended claims.

The invention further discloses systems, apparatus and articles of manufacture for implementing any of the aforementioned aspects of the invention.

The preferred features may be combined as appropriate, as would be apparent to a skilled person, and may be combined with any of the aspects of the invention.

DESCRIPTION OF FIGURES

The invention will now be described in detail with reference to the following figures in which:

FIG. 5 is shown as portion of data from a log file.

Figure 1:
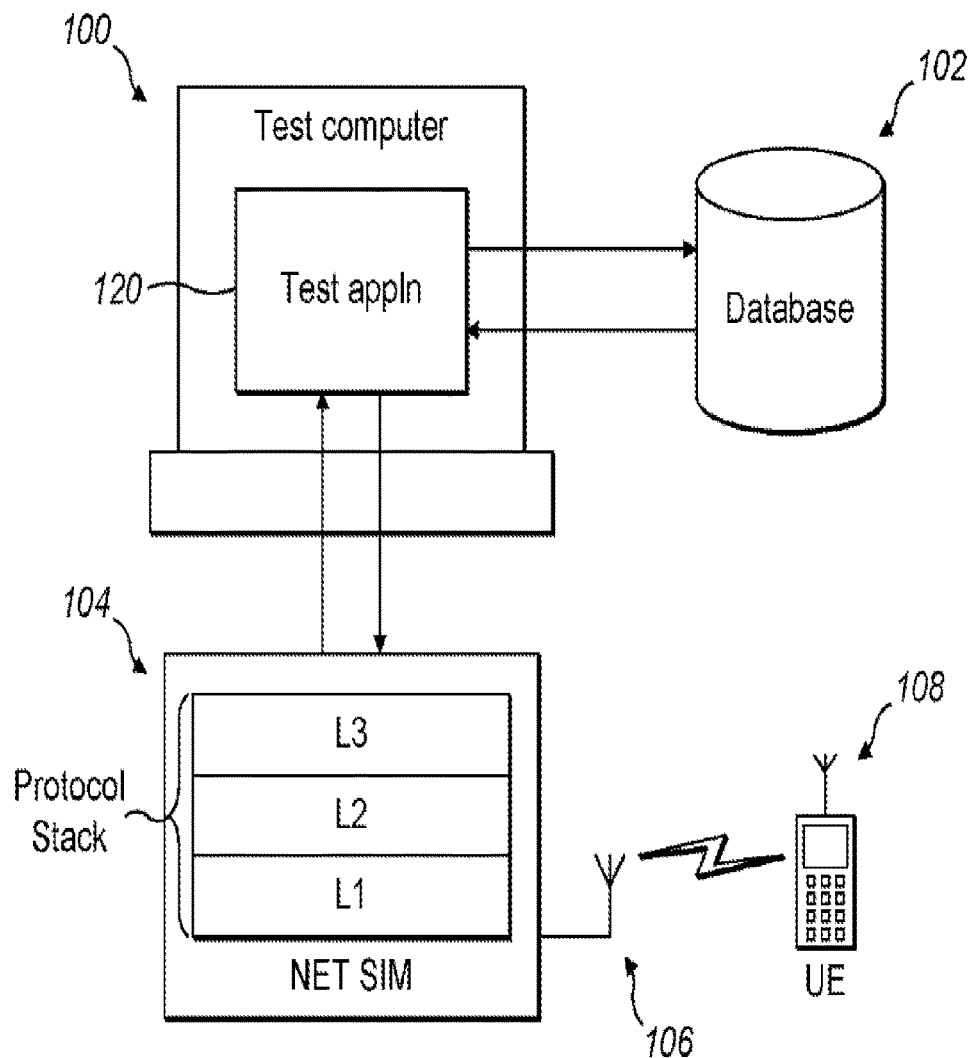
FIG. 1 is a diagram of a wireless test apparatus according to the prior art.

Embodiments according to the invention will now be described by way of example only.

It will be appreciated that although features from each of the embodiments may be identified by difference reference numerals in the figures and throughout the description, similar features including the properties and functionality attributed thereto, from one embodiment may be interchangeable with those of another embodiment.

DETAILED DESCRIPTION OF THE INVENTION

FIG. 1 shows a known type of wireless testing apparatus. The apparatus has a test computer 100 connected to a database 102 and also connected to any network simulator 104. The network simulator has a protocol stack capable in this case of emulating base station behaviours according to a known wireless communication standard. The protocol stack of the network simulator is connected to a wireless transceiver module which in turn is coupled to an antenna 106 capable of bidirectional wireless communication with user equipment 108.

In the arrangement of FIG. 1, the user equipment 108 is the equipment under test. A test application 120 running on the test computer 100 calls test specifications from the database 102 and configures the test scripts in order for them to be executed via the network simulator 104. Test scripts which might be recorded in the database may be based on 3GPP technical specifications such as 24.008, 24.301, 25.331, 36.331 or 44.018 series.

In use, the test application 120 determines control parameters for the network simulator including, but not limited to, settings for the various layers of the protocol stack and other configurable network settings according to the test script. Preferably, the test application 120 also schedules and/or controls the sending of messages between the network simulator transceiver unit 106 and the user equipment 108 according to the test script.

Figure 2:
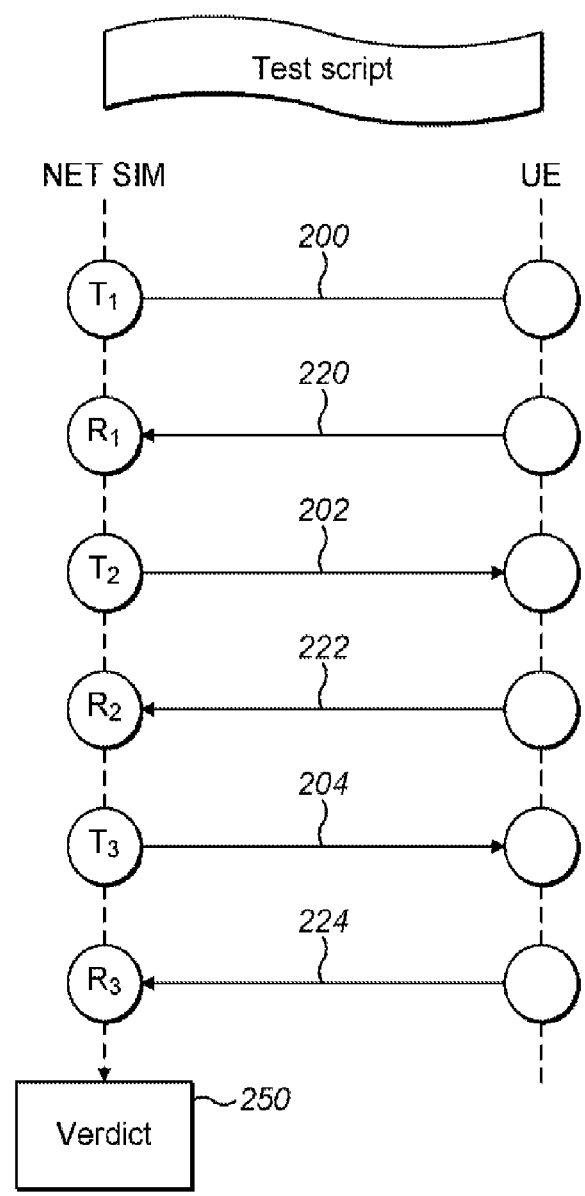
FIG. 2 is a schematic representation of a test script according to script-based testing.

FIG. 2 shows a test script of an exemplary script-based determinative testing technique. At a time T1 a first test message 200 according to the test script is sent from the network simulator (for example by network simulator transceiver unit 106) to the user equipment 108. At a time R1 a response message 220 from the user equipment 108 is received by the network simulator. At a time T2 a second test message 202 is sent from the network simulator to the user equipment 108 and in response thereto a further response message 222 from the user equipment 108 is received at the network simulator at time R2. In this example, the illustrated portion of the test script includes a third cycle of test message 204 and response 224 messages.

The types of messages may include, but are not limited to, radio resource control messages (e.g. Radio Bearer Setup message and Radio Bearer Setup Complete response), authentication and security control messages (e.g. Security Mode Command, Security Mode Complete response). Typically, the scripts involve tens to hundreds of messages and may run for a few minutes to several hours.

Each message sent from the network simulator is prescribed exactly in accordance with the test script, even where certain later test messages in the script take into account earlier responses from the user equipment 108. Hence, such test scripts remain highly deterministic even where they include script branches that may or may not be followed depending upon a response from the user equipment 108. The responses provide the verdict 250, which is either a "pass" or a "fail". In this type of deterministic testing an expected response is an inevitable consequence of an antecedent cause. The antecedent cause may be a single test message or a series of test messages but the inevitable consequence will either be met or not by the user equipment 108 response. The test software identifying the inevitable consequence in this type of script-based testing represents a "pass", while the absence of the inevitable consequence where expected represents a "fail".

The other extreme is non-automated user-driven testing according to which a human operator of graphical user interface of the network simulator generates a test message to be sent to the user equipment 108 and analyses the response received back from the user equipment 108, at the time of test execution. The human operator can then determine what test message to send next and also decides whether the user equipment 108 has passed or failed, usually with reference to guideline materials.

Figure 3:
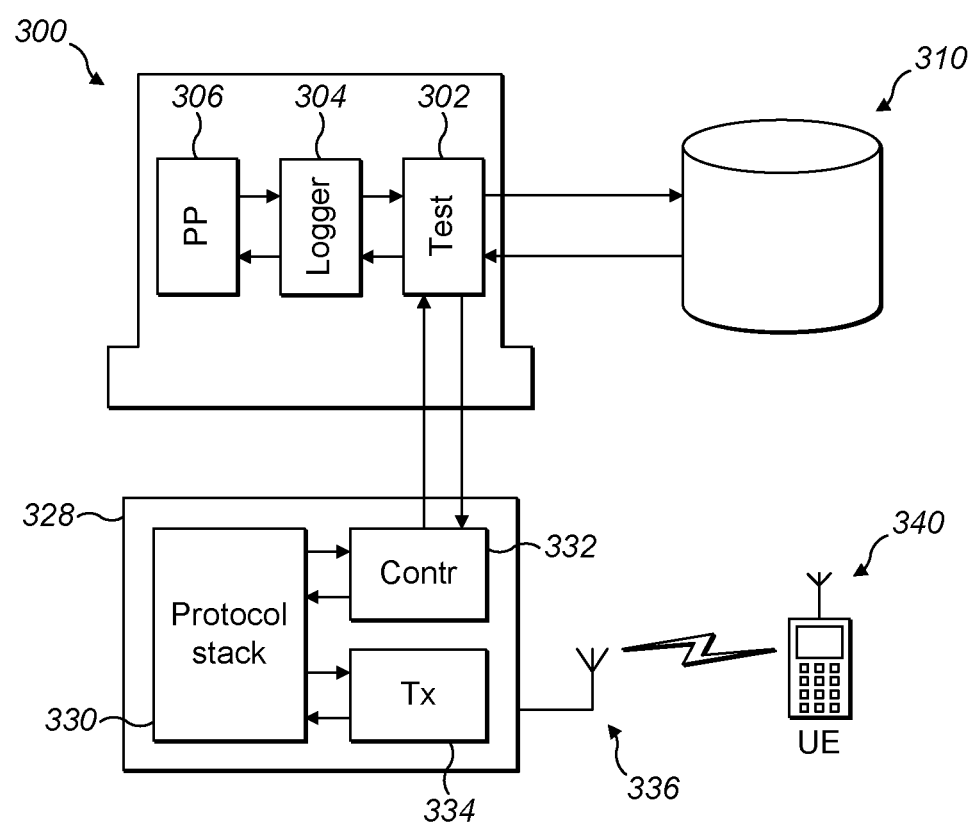
FIG. 3 is a diagram of a wireless test apparatus according to an embodiment of the present invention.

FIG. 3 shows a wireless test apparatus according to an embodiment of the invention.

The apparatus has a test computer 300 connected to a database 310 and also connected to a network simulator 328. The network simulator 328 includes a controller 332, protocol stack module(s) 330, and a wireless transceiver 334. The protocol stack modules 330 are connected to the wireless transceiver 334, which is, in turn, is coupled to an antenna 336 capable of bidirectional wireless communication with user equipment 340. The equipment 340 under test may be, for example, a cellular phone, PDA, tablet or other mobile computer, dongles connected to a computer, software based protocol stacks running on a computer, prototype hardware and/or embedded wireless devices for machine to machine type applications.

The test computer 300 is provided with a suite of applications including in this example a test application 302, a logger application 304 and a post-processing application 306. The novel test application 302 running on the test computer 300 calls test specifications from the database 310 and configures novel types of non-determinative test regimes in order for them to be automatically executed via the network simulator 328. Examples of certain test specifications which might be recorded in the database include, but are not limited to, those for determining long term signalling overheads (i.e. volume of signalling), and/or determination of signalling event frequency (timing of signalling).

In this example, the protocol stack module 330 is a configurable protocol stack in that its various layers can support a variety of known wireless telecommunication radio access technologies including, for example, 2G, 3G and/or LTE (also referred to as 4G) telecommunications protocols.

In use, the test application 302 determines control parameters for the network simulator 328 including settings for the various layers in the protocol stack 330 and other configurable network settings according to the test specification. The test application 302 is configured to send the control parameters to the controller 332 of the network simulator 328. The controller 332 then sets control parameters of configurable blocks within the protocol stack of the network simulator 328 and preferably any other network simulator settings that are desired according to the initial part of the test. For example, according to instructions from the test application 302 the controller 322 may set configurable parameters of the various layers in the protocol stack, including parameters in layers 3, 2 or 1 (layer 1 also being known as the physical layer or PHY layer). This parameterisation of the network simulator 328 to achieve the first desired network state according to the non-deterministic test regime may involve setting for example PDCP parameters, RLC/MAC parameters and PHY layer parameters according to a first network state desired in a first part of the test. In particular, it can be useful in these types of tests to be able to set accept/reject/ignore configuration procedures initiated by the user equipment 340 and for the values of timers and or counters signaled to the user equipment 340.

The initial network state to be used in testing the user equipment 340 may be a particular parameterised network setting. Alternatively, or additionally, it may cause a message or set of messages to be sent from the network simulator 328 in a particular parameterized state. Thereafter, the test application 302 controls the network simulator 328 to enter an interactive mode in which the parameterized network simulator and the user equipment 340 communicate in an unscripted manner. For example, the adoption of the initial network state to be used in testing may be followed by the communication of one or more messages from the user equipment 340 to the network simulator 328 and the network simulator 328 may respond based on its state.

During execution of the test regime the test computer 300 remains in communication with the controller 332 of the network simulator 328. The logger software 304 records data about the series of events and communications between the network simulator 328 and user equipment 340 in a log file. Such a log file may include, for example, time stamped records of the various states and conditions adopted by the network simulator and the user equipment, and/or a record of messages sent between them. The log file may further include data relating to the messages themselves including, for example, payload data and/or size data.

After a point in time, the test application 302 can cause the network simulator 328 to change to a second network state in order to enter a second interactive mode enabling further unscripted interaction between the user equipment 340 and the network simulator 328 in its second state. The change from the initial network state to the second network state may be, automatically or manually programmed for example to occur after a certain time delay, at a particular time or it may be programmed to occur responsive to a trigger associated with the user equipment 340 or the network simulator 328. For example, the trigger could be a particular event associated with the user equipment 340 or it could be a particular event associated with the network simulator 328. For either the network simulator 328 or the user equipment 340 a trigger event could include, for example, the establishment of a particular condition or the sending of a particular message. The second network state can be a re-parameterization of the network. Alternatively, or in addition, the second network state can be the sending of a particular message or set of messages from the parameterized (or reparameterised) network simulator 328 to the user equipment 340.

According to the test regime executed by the test application there may be any number of programmed network simulator state changes with unscripted interactive periods interposed between them. From this description, it will be apparent that having deployed the initial network simulator state, the test application 302 does not drive the sending of highly defined scripted messages between the network simulator wireless transceiver 334 and the user equipment 340, as with known test scripts. Instead, interactive mode represents a type of unscripted period of communication between the user equipment 340 and the network simulator 328, during which the network simulator 328 under the control of the test application 302 monitors and records the unscripted communications. These may include sequences of signalling, user data, periods of inactivity or any other system behaviour. These types of communication include, for example, the user equipment 340 attempting to register with the network, requesting data channels to transfer produced by the user equipment 340, and/or sending of measurements about network conditions monitored by the user equipment 340. When the programmed trigger for the next network simulator state change is detected control moves the process onwards according to the test regime.

Figure 4:
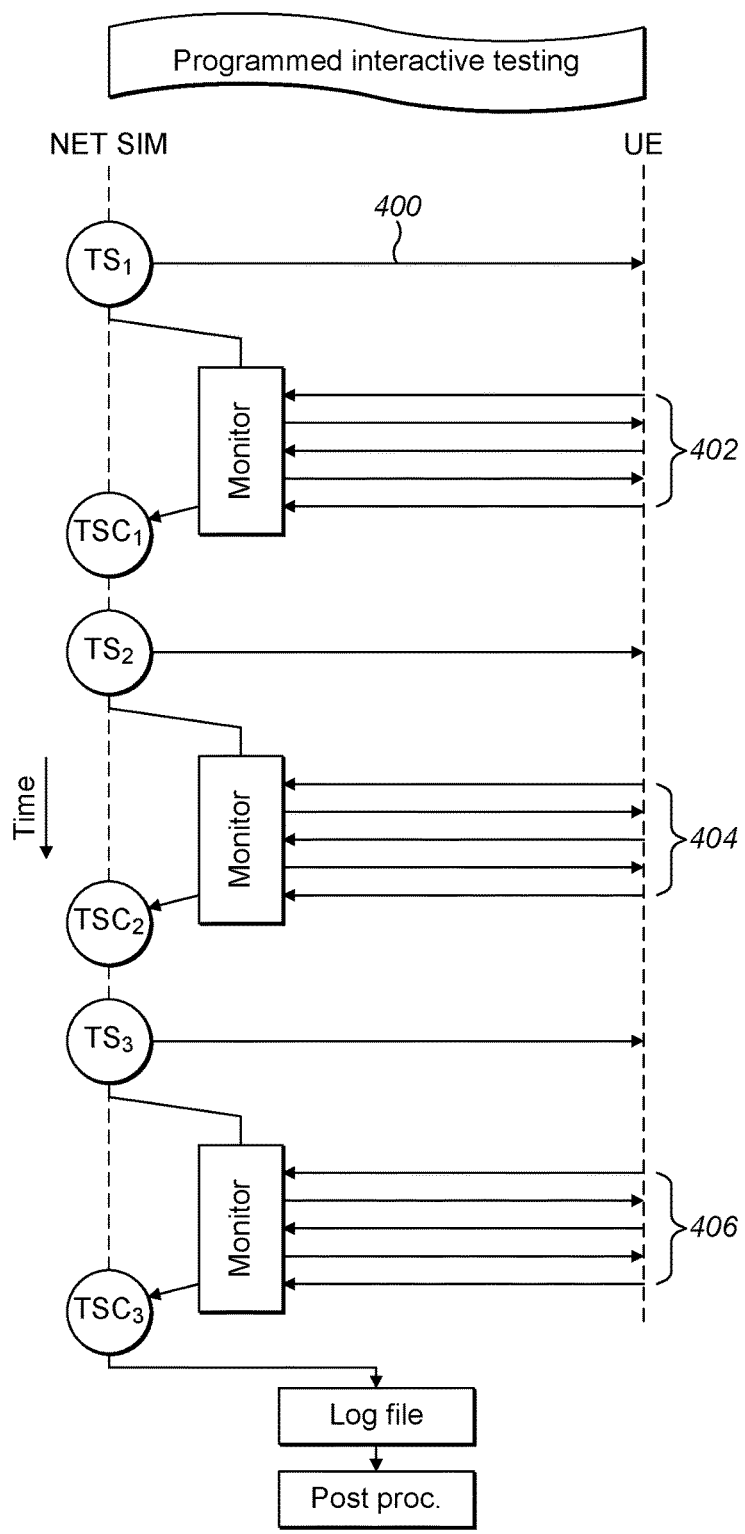
FIG. 4 is a schematic representation of non-scripted automated testing according to an embodiment of the present invention.

FIG. 4 schematically illustrates communications between a network simulator 328 and user equipment 340 of inter alia FIG. 3 according to one embodiment of the present invention implementing nondeterminative testing regimes.

At time TS1, the network simulator 328 adopts an initial network state according to the test regime being automatically executed by the test software 302. In this example, the initial network state includes a parameterization of the network simulator 328 as well as the sending of a test message 400 from the network simulator 328 to the user equipment 340. Thereafter, the network simulator 328 enters an interactive mode during which there exists a period of unscripted communication 402 between the network simulator 328 and the user equipment 340. It will be clear from previous explanations that "interactive mode" in this context means a period of communication between the user equipment 340 and the parameterised network simulator 328 that is not scripted or directly controlled by the test application 302, rather the user equipment 340 and network simulator 328 are enabled to pursue interactive communications according to their normal modes of operation in the circumstances. The communications are monitored and recorded by the test computer 300 running the test application 302 and logger application 307.

At a later time TSC1 the test application 302 recognizes the programmed trigger for a state change of the network simulator 328 and implements the state change such that the network simulator 328 is re-parameterised as necessary and adopts its second network state at a time TS2. In its second network state, the network simulator 328 enters a mode of interactive communications 404 with the user equipment 340. As before, the test computer 300 monitors a period of interactive, unscripted communication between the network similar in its second state and the user equipment 340 and records relevant data in log file. The second period of interactive communications 404 comes to an end at time TSC2 when test application 302 control determines the trigger for a further state change of the network simulator 328.

This further state change of the network simulator 328 into a third network state occurs at time TS3. In this example, the third network state of the network simulator 328 is achieved by reparameterization without sending of any test message to the user equipment 340. Thereafter, the network simulator 328 and user equipment 340 enter a third period 404 of interactive, unscripted communications that are recorded by the test computer in log files. As before, the period of interactive communication comes to an end with the determination by control of the programmed trigger at time TSC3.

The implemented test regime may comprise any desired number of programmed network simulator state changes and interactive communication periods. The log files may include, for example, information including network simulator settings, user equipment conditions or settings, user equipment device IDs, user equipment type and/or manufacturer, message type, timestamps, payload data, application code, and/or any other data useful in the context of nondeterminative wireless testing regimes of user equipment.

The post processing software 306 is used to automatically parse log files to determine test verdicts. For example, the post processing software may parse log files to determine data throughputs achieved under different network configurations (for example, under varying transceiver power levels and/or channel qualities). Alternatively, or additionally, the post processing software may automatically identify various types of over communication between user equipment 340 and the network simulator 328, including particular user equipment devices leading to high levels of unnecessary communication with the network. The post processing software can preferably yield useful reports on message counts and/or message delays and/or automatically compare results with test specifications in order to alert particular problems.

A skilled person will appreciate that the test computer 300 and the network simulator 328 may comprise more than one computer and that various test application and network simulation functions described herein may be implemented differently and/or across multiple computers. For example, the test computer 300 may be assisted by an automation computer configured to control devices and/or execute application programs. Test scripts can contain commands that are sent over a predefined connection to an automation computer. The automation computer may look up the command in a user defined configuration file and takes the appropriate action, which may, for example, be to control an application or hardware outside the scope of the test computer, and/or to request status information from the application or hardware. The protocol stack, or layers within the protocol stack, or other components of the network simulator, could be implemented differently than shown with parts of the network simulator is being implemented across different computers as may be desired. Alternatively, the test computer and the network simulator may be provided as one device.

It is possible to test user or other equipment, including the protocol stack functions in a software only environment. In such arrangements, the test equipment does not need all of the standard hardware associated with wireless user equipment such as a mobile phone. Hence, other embodiments of the invention are configured to perform equipment testing in software environments and without standard hardware like the antenna.

The hardware elements, operating systems and programming languages of such computers maybe conventional in nature, and it is presumed that those skilled in the art are adequately familiar therewith. Of course, the functions may be implemented, at least in part, in purpose built hardware or in application specific firmware. Any component or function described, some of which are necessary to perform the inventions, may be distributed in any suitable fashion across a number of components or platforms, to distribute the processing load.

Here, aspects of the methods and apparatuses described herein can be executed on a computing device such as a server. Program aspects of the technology can be thought of as "products" or "articles of manufacture" typically in the form of executable code and/or associated data that is carried on or embodied in a type of machine readable medium.

"Storage" type media include any or all of the memory of the computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

Hence, a machine readable medium may take many forms, including but not limited to, a tangible storage carrier, a carrier wave medium or physical transaction medium. Non-volatile storage media include, for example, optical or magnetic disks, such as any of the storage devices in computer(s) or the like, such as may be used to implement the encoder, the decoder, etc. shown in the drawings. Volatile storage media include dynamic memory, such as the main memory of a computer platform. Tangible transmission media include coaxial cables; copper wire and fiber optics, including the wires that comprise the bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards, paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will appreciate that while the foregoing has described what are considered to be the best mode and, where appropriate, other modes of performing the invention, the invention should not be limited to specific apparatus configurations or method steps disclosed in this description of the preferred embodiment. It is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings. Those skilled in the art will recognize that the invention has a broad range of applications, and that the embodiments may take a wide range of modifications without departing from the inventive concept as defined in the appended claims.

Although the present invention has been described in terms of specific exemplary embodiments, it will be appreciated that various modifications, alterations and/or combinations of features disclosed herein will be apparent to those skilled in the art without departing from the spirit and scope of the invention as set forth in the following claims.

The invention claimed is:

1. A test apparatus configurable to perform non-determinative testing of equipment, the apparatus comprising:
a test computer arranged to automatically execute a non-determinative test regime under control of a test application; and
a network simulator connected to the test computer and provided with communication circuitry operable to communicate with the equipment under test, the network simulator being configurable into a plurality of different network states with an unscripted interactive period interposed between each of the plurality of different network states, and according to the non-determinative test regime, wherein the test application is operable to control the network simulator to transition between the plurality of different network states and to monitor data of communications between the network simulator and the equipment during each unscripted interactive period between said transitions.

2. The test apparatus of claim 1, wherein the network simulator comprises a protocol stack module configurable by the test application.

3. The test apparatus of claim 1, wherein the network simulator comprises a protocol stack module configurable via the test application between network states adopting different radio access technologies.

4. The test apparatus of claim 1, wherein the test application comprises a test regime comprising a plurality of preprogrammed transitions between different network states.

5. The test apparatus of claim 1, wherein the test application is operable to cause the network simulator to adopt new network settings as part of a transition to a new network state.

6. The test apparatus of claim 1, wherein the test application is operable to cause the network simulator in a new network state to send a test message to the equipment.

7. The test apparatus of claim 1, wherein the network simulator is operable to transition between different network states based upon one or more of a specific time or a time delay.

8. The test apparatus of claim 1, wherein the network simulator is operable to transition between different network states based upon one or more of a specific time or a time delay.

9. The test apparatus of claim 1, wherein the network simulator is operable to transition between different network states responsive to a trigger event, and wherein the trigger event is a condition met within one or more of the equipment and the network simulator.

10. The test apparatus of claim 1, wherein the network simulator is operable to transition between different network states responsive to a trigger event.

11. The test apparatus of claim 10, wherein the trigger event is predetermined message received by the network simulator from the equipment.

12. The test apparatus of claim 1, further comprising a logger operable to record data relating to the plurality of network states and for relevant network states associated data relating to the communications between the network simulator and the equipment.

13. The test apparatus of claim 12, further comprising a software tool operable to automatically analyse data recorded by the logger in order to determine a test outcome.

14. A test application for network simulator-based testing of equipment, the test application comprising a non-transitory computer-readable medium comprising instructions that when executed by a computer cause the computer to:
establish a first network simulator state using a first set of network parameters to be used according to a non-determinative test regime;
monitor unscripted interactive periods of communication between the network simulator and the equipment while the network simulator is in said first state;
cause the network simulator to transition to another network simulator state based upon a second set of network parameters according to the test regime, monitor an unscripted interactive period of communication between the network simulator and the equipment while the network simulator is in said second state, wherein the unscripted interactive period is interposed the first and second states; and
cause log data relating to each network simulator state and associated communications between the network simulator and the equipment to be recorded in a log file.

15. A network simulator configured for testing of equipment, the network simulator comprising:
a protocol stack module;
transmission circuitry for communications with the equipment; and
a controller having an interface to a test application, the controller being operable to receive parameters from the test application, including protocol stack parameters, and to cause the network simulator to successively transition between a plurality of different programmed network simulator states based on said parameters, with an unscripted interactive period interposed between each of the plurality of different programmed network states, wherein the controller is operable to monitor each unscripted interactive period of wireless communication between the equipment under test and the network simulator during each network state.

16. The network simulator of claim 15, wherein the transmission circuitry for communications with the equipment includes at least one antenna.

* * * * *